United States Patent
Hasegawa (10) Patent No.: US 11,204,686 B2
(45) Date of Patent: *Dec. 21, 2021

(54) DISPLAY CONTROL DEVICE AND METHOD (71) Applicant: TOSHIBA TEC KABUSHIKI KAISHA, Tokyo (JP)

(72) Inventor: Keiichi Hasegawa, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,848

(22) Filed: Oct. 14, 2020

(65) Prior Publication Data

US 2021/0026506 A1 Jan. 28, 2021

Related U.S. Application Data (63) Continuation of application No. 16/151,143, filed on Oct. 3, 2018, now Pat. No. 10,838,590.

(30) Foreign Application Priority Data

Oct. 26, 2017 (JP) .............................. JP2017-207527

(51) Int. Cl.
*G06Q 30/00* (2012.01)
*G06F 3/0482* (2013.01)
(Continued)

(52) U.S. Cl.
CPC .......... *G06F 3/0482* (2013.01); *G06F 3/0412* (2013.01); *G06F 3/0483* (2013.01);
(Continued)

(58) Field of Classification Search
None
See application file for complete search history.

(56) References Cited

U.S. PATENT DOCUMENTS 9,218,129 B2 12/2015 Smith
9,875,017 B2 1/2018 Nomachi et al.
(Continued)

FOREIGN PATENT DOCUMENTS

| JP | 2013-117936 A | | 6/2013 |
|----|---------------|---|--------|
| JP | 2013117936 A | * | 6/2013 |
| KR | 10-2011-0092624 A | | 8/2011 |

OTHER PUBLICATIONS

IP.com Search Strategy dated May 5, 2021. (Year: 2021).*

(Continued)

*Primary Examiner* — Matthew T Sittner
(74) *Attorney, Agent, or Firm* — Kim & Stewart LLP (57) ABSTRACT

A content display control device includes a touch display, and a processor configured to control the touch display to display a first screen that includes all of a first image, display a second screen in place of the first screen in response to a first operation on the touch display while the first screen is displayed, the second screen including most of the first image and a part of a second image, display a third screen in place of the second screen in response to a second operation on the touch display while the second screen is displayed, the third screen including all of the second image, and display a fourth screen in place of the second screen if the second operation is not made on the touch display within a predetermined period of time while the second screen is displayed.

18 Claims, 5 Drawing Sheets

(51) Int. Cl.
*G06F 3/041* (2006.01)
*G06F 3/0481* (2013.01)
*G06F 3/0488* (2013.01)
*G06Q 30/02* (2012.01)
*G06F 3/0483* (2013.01)
*G06Q 20/04* (2012.01)

(52) U.S. Cl.
CPC ........ *G06F 3/0488* (2013.01); *G06F 3/04817* (2013.01); *G06Q 20/047* (2020.05); *G06Q 30/0241* (2013.01)

(56) References Cited

U.S. PATENT DOCUMENTS

| | | |
|---|---|---|
| 2001/0007980 A1 | 7/2001 | Ishibashi et al. |
| 2002/0067348 A1 | 6/2002 | Masters et al. |
| 2005/0205660 A1* | 9/2005 | Munte ................ G06Q 20/1085 235/379 |
| 2011/0001824 A1 | 1/2011 | Chang |
| 2011/0060988 A1 | 3/2011 | Mysliwy et al. |
| 2012/0011437 A1* | 1/2012 | James ................... G06F 1/1643 715/702 |
| 2012/0249435 A1 | 10/2012 | Nahm |
| 2012/0280040 A1* | 11/2012 | Carney .................... G07G 5/00 235/383 |
| 2012/0296716 A1* | 11/2012 | Barbeau ................. G06Q 30/02 705/14.13 |
| 2013/0042207 A1 | 2/2013 | Matthews et al. |
| 2014/0095315 A1 | 4/2014 | Narendra et al. |
| 2014/0236713 A1 | 8/2014 | Gotanda et al. |
| 2014/0249951 A1 | 9/2014 | Gotanda et al. |
| 2015/0007092 A1 | 1/2015 | Park |
| 2015/0025986 A1* | 1/2015 | Patel .................... G06Q 20/384 705/16 |
| 2015/0106746 A1 | 4/2015 | Vojak |
| 2015/0186023 A1 | 7/2015 | Alisanski et al. |
| 2016/0370960 A1* | 12/2016 | Baek .................. G06F 3/04845 |
| 2017/0351769 A1 | 12/2017 | Karakas |
| 2018/0308061 A1 | 10/2018 | Al Jadda et al. |
| 2018/0310171 A1 | 10/2018 | Whitaker et al. |
| 2019/0129580 A1 | 5/2019 | Hasegawa |

OTHER PUBLICATIONS

STIC EIC 3600 Search Report for parent U.S. Appl. No. 16/151,143 (similar claims) dated Apr. 2020. (Year: 2020).*
STIC EIC 3600 Search Report for U.S. Appl. No. 17/070,848 dated May 10, 2021. (Year: 2021).*
Extended European Search Report dated Feb. 27, 2019 in corresponding European Patent Application No. 18201197.3, 8 pages.
STIC EiC 3600 Search Report for U.S. Appl. No. 16/151,143 dated Apr. 20, 2020 (Year: 2020).

* cited by examiner

DETAILS OF RECEIPT

SEPTEMBER 30th (SATURDAY)  ¥672
MART IN OSAKI

○○○ MART IN OSAKI
BUSINESS HOURS:9:30~20:00
TEL:0120-XXX-XXX

MART IN OSAKI 0120-XXX-XXX
SEPTEMBER 30th (SATURDAY), 2017  14:30  REGISTER 0001
STACKING NO.000000001 YAMADA TARO
SRID
9999999999999

| | |
|---|---|
| GREEN PEPPER | ¥118 |
| POTATO | ¥198 |
| CARROT | ¥98 |
| LETTUCE | ¥258 |
| SUBTOTAL | ¥672 |
| DEPOSIT | ¥1,000 |
| CHANGE | ¥328 |

FIG.5

DISPLAY CONTROL DEVICE AND METHOD

CROSS-REFERENCE TO RELATED APPLICATION

This application is a continuation of U.S. patent application Ser. No. 16/151,143, filed Oct. 3, 2018, which is based upon and claims the benefit of priority from Japanese Patent Application No. 2017-207527, filed in Oct. 26, 2017, the entire contents of which are incorporated herein by reference.

FIELD

Embodiments described herein relate generally to a display control device and method.

BACKGROUND

An electronic receipt service is known as an online service that allows a user to browse receipts issued and received from stores on the user's terminal such as a smartphone. Conventional electronic receipt services do not show any advertisement when displaying such receipts on the screen.

On the other hand, an online service operated by a content service provider displays an advertisement when the user switches the contents displayed on the screen. In turn, the user has to operate his or her device to confirm and close the advertisement, which may cause inconvenience to the user.

Under such circumstances, there is a need for a scheme that allows the user to browse contents including electronic receipts without impairing convenience for the user.

DETAILED DESCRIPTION

Embodiments provide content display control device implemented in a computer system to generate graphical user interfaces for electronic receipt management in a specific manner that improves usability of the graphical user interfaces.

In accordance with an embodiment, a content display control device comprises a touch display, and a processor configured to control the touch display to display a first screen that includes all of a first image, display a second screen in place of the first screen in response to a first operation on the touch display while the first screen is displayed, the second screen including most of the first image and a part of a second image, display a third screen in place of the second screen in response to a second operation on the touch display while the second screen is displayed, the third screen including all of the second image, and display a fourth screen in place of the second screen if the second operation is not made on the touch display within a predetermined period of time while the second screen is displayed.

Hereinafter, an embodiment is described with reference to the accompanying drawings. In an embodiment, a user terminal included in an electronic receipt system functions as a content display control device.

Figure 1:
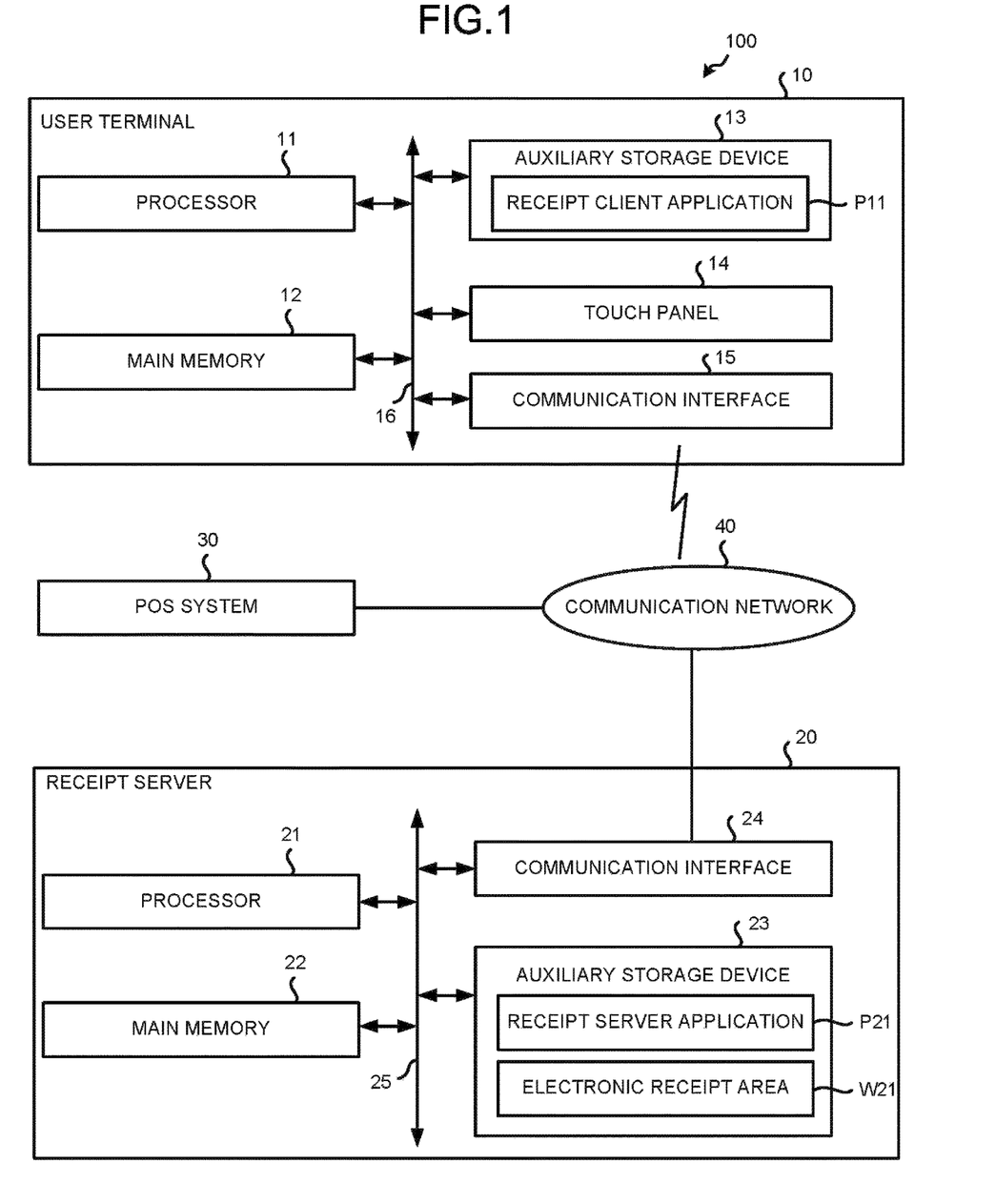
FIG. 1 is a block diagram illustrating a schematic configuration of an electronic receipt system and a circuit configuration of main portions of a user terminal and a receipt server included in the electronic receipt system according to an embodiment.

FIG. 1 is a block diagram illustrating a schematic configuration of an electronic receipt system 100, and a circuit configuration of main portions of a user terminal 10 and a receipt server 20 contained in the electronic receipt system 100 according to an embodiment.

The electronic receipt system 100 is constituted in such a manner that the user terminal 10, the receipt server 20 and a POS (point-of-sale) system 30 can communicate with each other via a communication network 40. The communication network 40 may include the Internet, a VPN (Virtual Private Network), a LAN (Local Area Network), a public communication network, a mobile communication network, etc. singly or in an appropriately combined manner. The electronic receipt system 100 typically includes a plurality of the user terminals 10 and a plurality of POS systems 30, but in FIG. 1, only one user terminal 10 and one POS system 30 are shown.

The user terminal 10 displays a screen for a user of an electronic receipt service provided by the electronic receipt system 100, to browse contents of a transaction and a result of checkout based on his or her operation. If a plurality of the user terminals 10 is contained in the electronic receipt system 100, these plural user terminals 10 may be used by the same user or may be individually used by different users. Alternatively, one user terminal 10 may be shared by plural users.

The receipt server 20 acquires receipt data indicating the content of the transaction and the result of checkout managed by the POS system 30 from the POS system 30 and stores the receipt data. The receipt server 20 generates data relating to a receipt image (hereinafter, referred to as receipt image data) indicating contents of the receipt data and transmits the receipt image data to the user terminal 10.

The POS system 30 performs a processing for registering contents of a transaction such as commodity sales in a retail store and then performing checkout of the transaction. When the customer who has engaged in the transaction is a member of the electronic receipt service, the POS system 30 transmits electronic receipt data relating to the transaction to the receipt server 20.

The user terminal 10 is typically a portable type information processing device such as a smartphone, a mobile phone, a tablet terminal, or the like. The user terminal 10 may be a stationary type information processing apparatus such as a desktop type personal computer or the like.

The user terminal 10 includes a processor 11, a main memory 12, an auxiliary storage device 13, a touch panel 14, a communication interface 15, and a transmission path 16. The processor 11, the main memory 12, the auxiliary storage device 13, the touch panel 14 and the communication interface 15 are connected with each other via the transmission path 16. The transmission path 16 includes an address bus, a data bus, a control signal line, and the like, and transmits data and control signals to be transmitted and received between the connected sections.

The processor 11, the main memory 12 and the auxiliary storage device 13 in the user terminal 10 are connected with each other through the transmission path 16 to constitute a computer for performing an information processing for controlling the user terminal 10.

The processor 11 acts as a central part of the computer. The processor 11 controls each section to realize various functions of the user terminal 10 by executing operating systems and application programs.

The main memory 12 includes a non-volatile memory area and a volatile memory area. The main memory 12 stores the operating systems and the application programs in the non-volatile memory area. The main memory 12 stores data necessary for the processor 11 to execute a processing for controlling each section in the non-volatile or volatile memory area in some cases. The main memory 12 uses the volatile memory area as a work area where data is appropriately rewritten by the processor 11.

The auxiliary storage device 13 acts as an auxiliary storage section of the computer. The auxiliary storage device 13 is, for example, an EEPROM (Electric Erasable Programmable Read-Only Memory). The auxiliary storage device 13 may also be an HDD (Hard Disk Drive), an SSD (Solid State Drive), or the like. The auxiliary storage device 13 stores data used for the processor 11 to execute various processing and data generated in the processing by the processor 11. The auxiliary storage device 13 stores the application programs.

One of the application programs stored in the auxiliary storage device 13 is an information processing program (hereinafter, referred to as a receipt client application) P11 for operating as a receipt client. Typically, however, the receipt client application P11 is downloaded via, for example, the Internet to be written in the auxiliary storage device 13 in response to an operation by a user of the user terminal 10. In other words, the transfer of the user terminal 10 to the user of the user terminal 10 is performed in a state in which the receipt client application P11 is not stored in the auxiliary storage device 13. However, the user terminal 10 in the state in which the receipt client application P11 is stored in the auxiliary storage device 13 may be transferred to the user of the user terminal 10.

The touch panel 14 functions as an input device and a display device of the user terminal 10.

The communication interface 15 is an interface for data communication via the communication network 40. As the communication interface 15, for example, a well-known communication device for performing data communication via a mobile communication network or the Internet can be used.

The receipt server 20 includes a processor 21, a main memory 22, an auxiliary storage device 23, a communication interface 24, a transmission path 25, and the like. The processor 21, the main memory 22, the auxiliary storage device 23 and the communication interface 24 are connected with each other by the transmission path 25. The transmission path 25 includes an address bus, a data bus, a control signal line, and the like, and transmits data and control signals to be transmitted and received between the connected sections.

In the receipt server 20, the processor 21, the main memory 22, and the auxiliary storage device 23 are connected with each other through the transmission path 25 to constitute a computer for performing an information processing for controlling the receipt server 20.

The processor 21 acts as a central part of the computer. The processor 21 controls each section to realize various functions of the receipt server 20 by executing operating systems and application programs.

The main memory 22 includes a non-volatile memory area and a volatile memory area. The main memory 22 stores the operating systems and the application programs in the non-volatile memory area. The main memory 22 stores data necessary for the processor 21 to execute a processing for controlling each section in the non-volatile or volatile memory area in some cases. The main memory 22 uses the volatile memory area as a work area where data is appropriately rewritten by the processor 21.

The auxiliary storage device 23 acts as an auxiliary storage section of the computer. The auxiliary storage device 23 is, for example, an EEPROM, an HDD, an SSD, or the like. The auxiliary storage device 23 stores data used for the processor 21 to execute various processing and data generated in the processing by the processor 21. The auxiliary storage device 23 stores the application programs in some cases. One of the application programs stored in the auxiliary storage device 23 is an information processing program (hereinafter, referred to as a receipt server application) P21 for operating as the receipt server 20.

The communication interface 24 performs data communication via the communication network 40. As the communication interface 24, for example, a well-known communication device which can perform data communication via the Internet can be used.

For example, the receipt server 20 can use a general-purpose computer device as basic hardware. At this time, typically, the receipt server application P21 and the computer device in a state in which the receipt server application P21 is not stored in the auxiliary storage device 23 are individually transferred to an operator of the receipt server 20. The transfer of the receipt server application P21 can be realized by recording the receipt server application P21 in a removable recording medium such as a magnetic disk, a magneto optical disk, an optical disk, a semiconductor memory or the like, or by downloading the receipt server application P21 via a network. In this case, the receipt server application P21 is written in the auxiliary storage device 23 in response to an operation by an administrator of the receipt server 20 or an installer of the receipt server 20 or the like.

The processor 21 allocates a part of the storage area of the auxiliary storage device 23 for an electronic receipt area W21. The electronic receipt area W21 stores receipt data.

For example, the receipt data includes an electronic receipt code, a user code, checkout data and details data. The electronic receipt code is a unique code for identifying each receipt data. The user code is a unique code that identifies the user of the electronic receipt service. The checkout data indicates a checkout result. The data for any other item can be contained in the checkout data; and it is assumed that a date and time when settlement is performed, a settlement amount, a settlement method and a store code for identifying a retail store where the settlement is performed are contained in the checkout data. The details data indicates details of the contents of the transaction which is the target of settlement.

Next, the operation of the electronic receipt system 100 configured as described above is described. A characteristic operation of the electronic receipt system 100 in an embodiment is an operation for allowing a user to browse a receipt image based on the receipt data stored in the electronic receipt area W21 with the user terminal 10. For example, the generation of receipt data in the POS system 30 or the collection and management of the receipt data in the receipt server 20 can be performed in the same way as in an existing electronic receipt system. Therefore, in the following description, an operation for the user to browse the receipt image with the user terminal 10 is mainly described. The content of the processing described below is merely an example, and various processing capable of achieving the same result can be appropriately used.

If a predetermined operation is performed with the touch panel 14 of the user terminal 10 by the user who wants to use the electronic receipt service, the processor 11 starts an information processing by executing the receipt client application P11. Then, if the user performs the predetermined operation for instructing start of browse of the receipt image with the touch panel 14, the processor 11 executes a processing for browsing the receipt image in the information processing by executing the above receipt client application P11.

Figure 2:
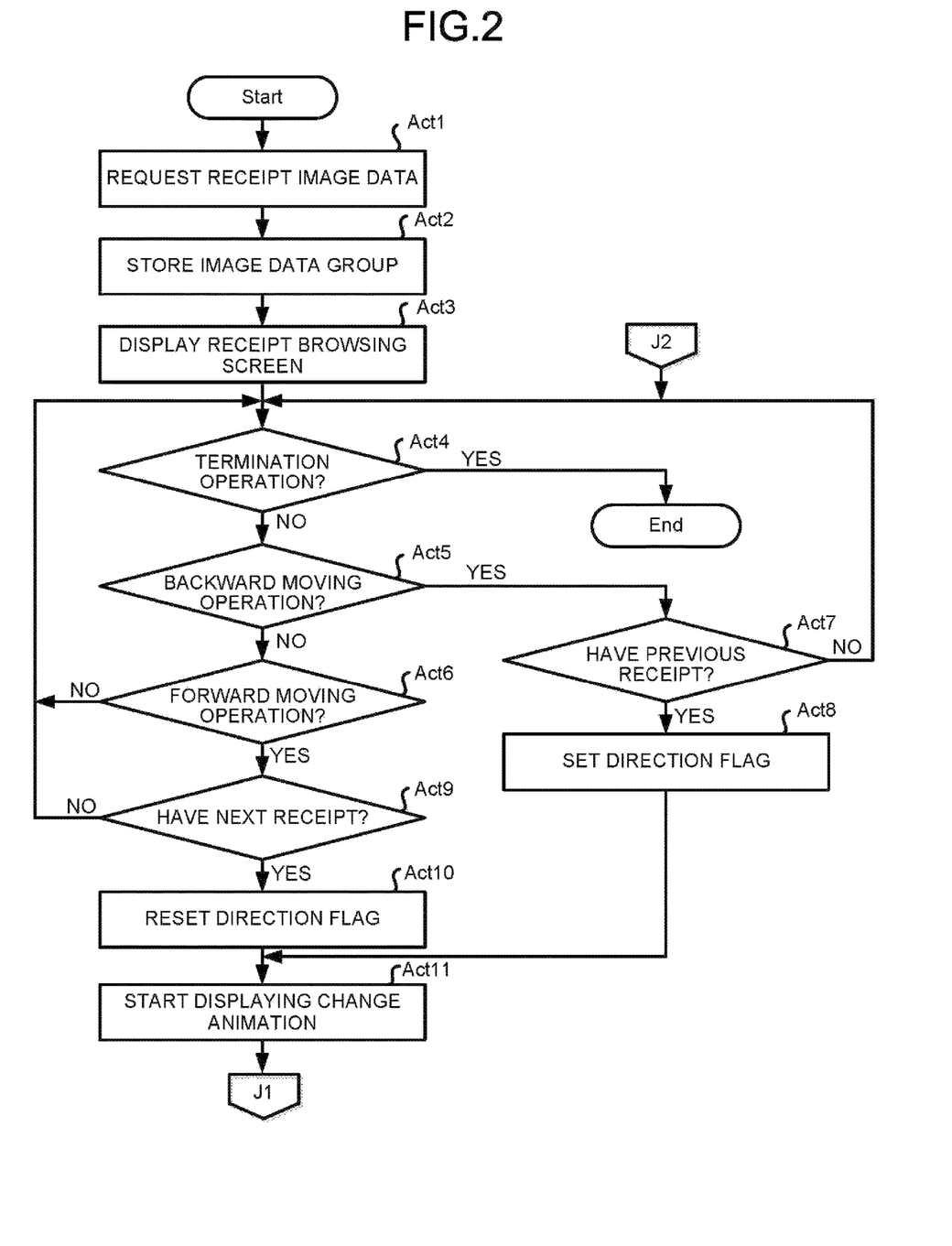
FIG. 2 is a flowchart depicting an information processing for a receipt image browsing by a processor provided in the user terminal in FIG. 1.
Figure 3:
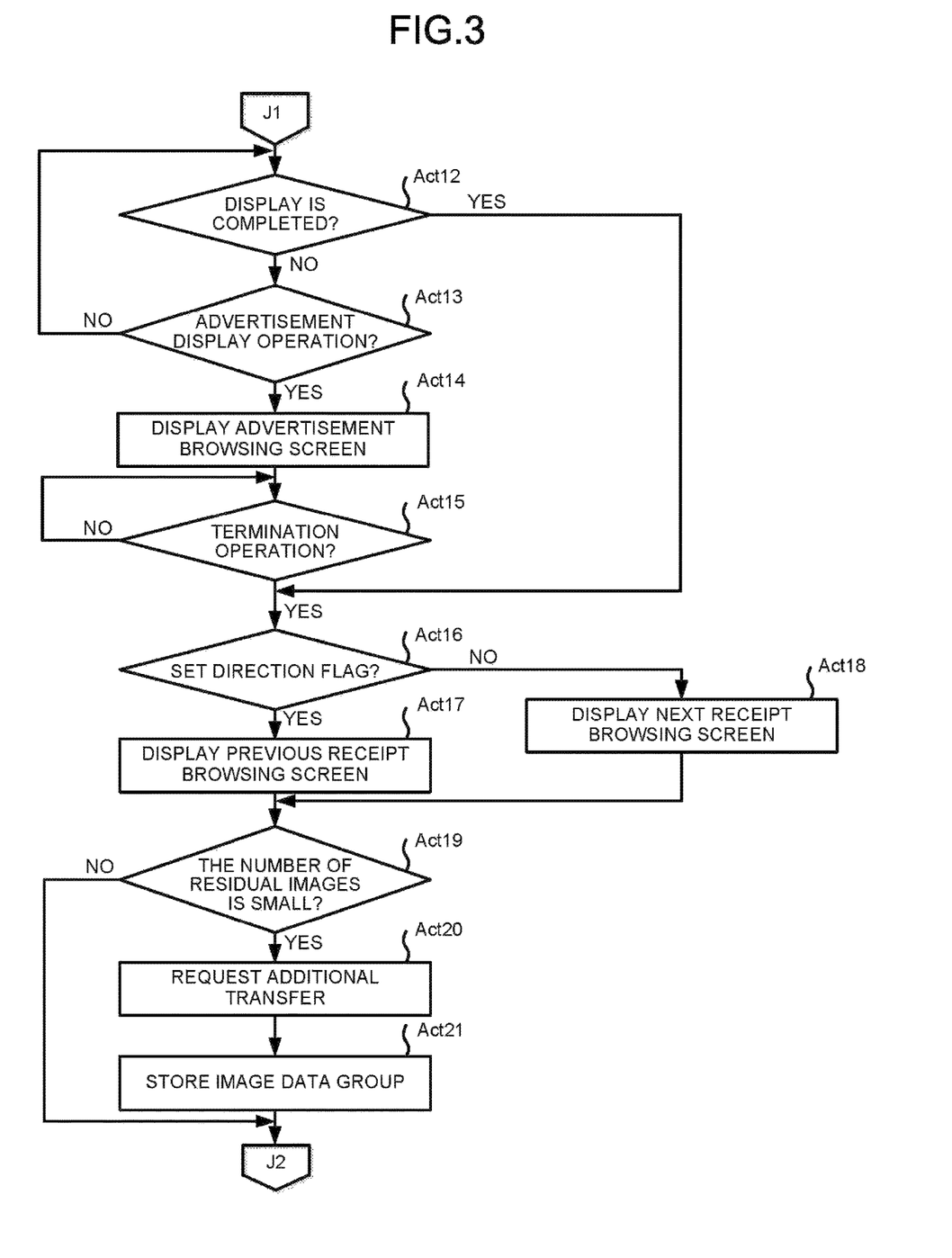
FIG. 3 is a flowchart depicting an information processing for the receipt image browsing by the processor provided in the user terminal in FIG. 1.

FIG. 2 and FIG. 3 are flowcharts illustrating information processing for the receipt image browsing by the processor 11.

In Act 1, the processor 11 requests receipt image data from the receipt server 20. Specifically, the processor 11 controls the communication interface 15 to transmit request data including a predetermined command for the request to the receipt server 20 through the communication network 40.

If the request data is transmitted to the receipt server 20 through the communication network 40, the request data is received by the communication interface 24. If the request is received, the processor 21 executes an information processing by executing the receipt server application P21. Then, the processor 21 performs the following processing in the information processing.

The processor 21 generates the receipt image data based on a part or all of the receipt data including a user code of the user who issues the request among the receipt data stored in the electronic receipt area W21 of the auxiliary storage device 23. The receipt image data refers to data of a receipt image in which various information indicated by the receipt data is shown in a format similar to that of a well-known paper receipt issued using a receipt paper. However, the receipt image may indicate various information in a format completely different from that of the paper receipt. At this time, the processor 21 specifies the user who issues the request based on the user code included in the request data. Alternatively, the processor 21 may specify the user who issues the request based on, for example, the user code acquired at the time of establishing a session with the user terminal 10 which issues the request.

The processor 21 also acquires advertisement image data to be presented to the user. The advertisement image data is data of an image indicating any type of advertisement. The advertisement image data may be acquired from any data source. For example, it is assumed that at least one of the auxiliary storage device 23, a store server or headquarters server contained in the POS system 30, or an advertisement server (not shown) communicable via the communication network 40 is set as the acquisition source. Then, any type of the advertisement image data may be acquired by the processor 21. As an example, the processor 21 acquires advertisement image data that matches narrowing-down conditions considering attributes of the user and the like. The processor 21 may acquire only one advertisement image data or a plurality of advertisement image data.

Then, the processor 21 controls the communication interface 24 to transmit an image data group composed of the receipt image data generated as described above and the acquired advertisement image data to the user terminal 10 which issues the request through the communication network 40. The processor 21 includes information for identifying a transaction corresponding to each receipt image data, such as a date and time at which the transaction corresponding to each the receipt image data is performed, in the image data group. The amount of the receipt image data and the amount of the advertisement image data contained in the image data group may be arbitrarily determined by, for example, a developer of the receipt server application P21 or the administrator of the receipt server 20. Alternatively, the amount of the receipt image data and the amount of the advertisement image data contained in the image data group may be arbitrarily determined by the user. In this case, at least one of the amount of the receipt image data and the amount of the advertisement image data is stored in the auxiliary storage device 23 as a setting for each user. As an example, it is assumed that the receipt image the amount of which corresponds to the predetermined number of transactions among the latest transaction is included in the image data group.

If the image data group is transmitted to the user terminal 10 through the communication network 40, the image data group is received by the communication interface 15.

In Act 2, the processor 11 stores the image data group received by the communication interface 15 as described above in the auxiliary storage device 13.

In Act 3, the processor 11 controls the touch panel 14 to display a receipt browsing screen. Specifically, the processor 11 generates the receipt browsing screen as a screen including a receipt image corresponding to one of the receipt image data stored in the auxiliary storage device 13, and controls the touch panel 14 to display the receipt browsing screen. At this time, it is assumed that the processor 11 controls the touch panel 14 to display the receipt image corresponding to the receipt image data relating to the newest transaction which is contained in the received image data group on the receipt browsing screen which is initially displayed. Alternatively, the processor 11 may control the touch panel 14 to first display a screen on which a list of the receipt image data or a catalog of transactions corresponding to the receipt image data is shown. The processor 11 may control the touch panel 14 to change the display to the receipt browsing screen including the receipt image corresponding to the designated receipt image data in response to a selection designation by the user from the list.

Figure 4:
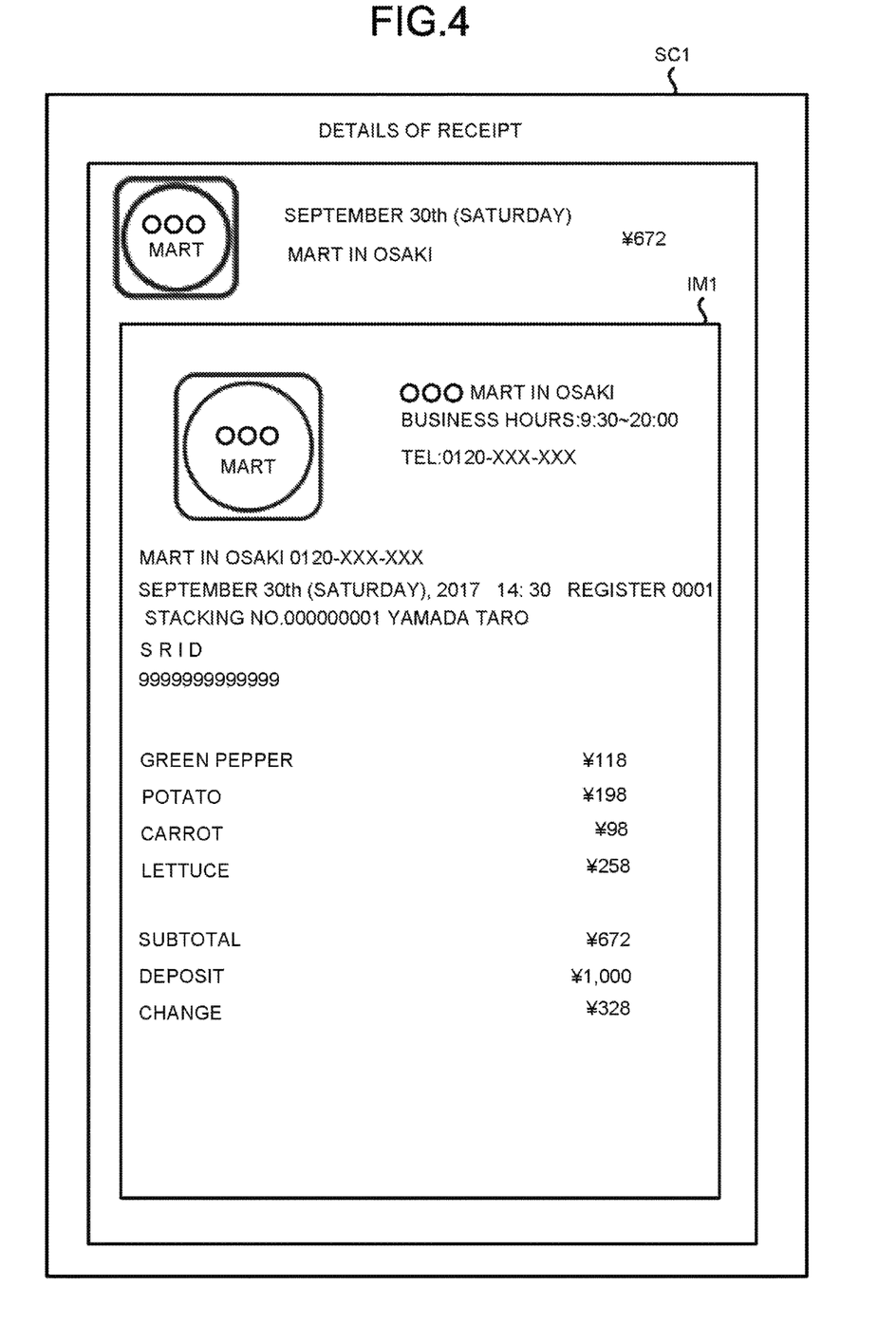
FIG. 4 is a diagram illustrating an example of a receipt browsing screen.

FIG. 4 is a diagram illustrating an example of a receipt browsing screen SC1.

The receipt browsing screen SC1 includes a receipt image IM1 based on the receipt image data.

In Act 4, the processor 11 determines whether or not a predetermined termination operation is performed. Then, if the corresponding operation is not performed, the processor 11 determines No, and proceeds to the processing in Act 5.

In Act 5, the processor 11 determines whether or not a predetermined backward moving operation is performed. Then, if the corresponding operation is not performed, the processor 11 determines No, and proceeds to the processing in Act 6.

In Act 6, the processor 11 determines whether or not a predetermined forward moving operation is performed. Then, if the corresponding operation is not performed, the processor 11 determines No and returns to the processing in Act 4.

In this way, the processor 11 stands by until any one of the termination operation in Act 4, the backward moving operation in Act 5 and the forward moving operation in Act 6 is performed.

When the user wants to confirm the contents of the transaction different from the transaction relating to the receipt browsing screen SC1 being displayed on the touch panel 14, the user performs a predetermined backward moving operation or forward moving operation. The backward moving operation is an operation for changing the transaction being displayed on the receipt browsing screen SC1 to the last transaction that is performed ahead. In an embodiment, the backward moving operation is an operation of swiping a display surface of the touch panel 14 in the left direction. The forward moving operation is an operation for changing the transaction being displayed on the receipt browsing screen SC1 to a transaction executed next to the corresponding transaction. In an embodiment, the forward moving operation is an operation of swiping the display surface of the touch panel 14 in the right direction. Then, if the backward moving operation is started, the processor 11 determines Yes in Act 5, and proceeds to the processing in Act 7. The swiping operation is an operation of sliding the screen by a finger in contact with the screen.

In Act 7, the processor 11 determines whether or not there is a previous receipt. Then, if the receipt image data relating to the transaction performed earlier than the transaction displayed on the receipt browsing screen SC1 being displayed is contained in the image data group stored in the auxiliary storage device 13, the processor 11 determines Yes, and then proceeds to the processing in Act 8. If the corresponding receipt image data is not contained in the image data group, the processor 11 determines No and returns to the standby state in Act 4 to Act 6.

In Act 8, the processor 11 sets a direction flag to a set state. The direction flag indicates a change direction of the receipt browsing screen SC1. In an embodiment, the direction flag indicates that the set state is the backward moving direction. In an embodiment, the direction flag indicates that the reset state is the forward moving direction. The direction flag is realized, for example, as data stored in the main memory 12 or the auxiliary storage device 13.

If the forward moving operation is started in the standby state of Act 4 to Act 6, the processor 11 determines Yes in Act 6, and proceeds to the processing in Act 9.

In Act 9, the processor 11 determines whether or not there is a next receipt. Then, if the receipt image data relating to the transaction performed later than the transaction displayed on the receipt browsing screen SC1 being displayed is contained in the image data group stored in the auxiliary storage device 13, the processor 11 determines Yes, and proceeds to the processing in Act 10. If the corresponding receipt image data is not contained in the image data group, the processor 11 determines No and returns to the standby state of Act 4 to Act 6.

In Act 10, the processor 11 sets the direction flag to the reset state.

If the direction flag is set to the set state or a reset state in Act 8 or Act 10, the processor 11 proceeds to the processing in Act 11.

In Act 11, the processor 11 starts displaying a change animation on the touch panel 14. The change animation is an animation for changing the receipt browsing screen.

Figure 5:
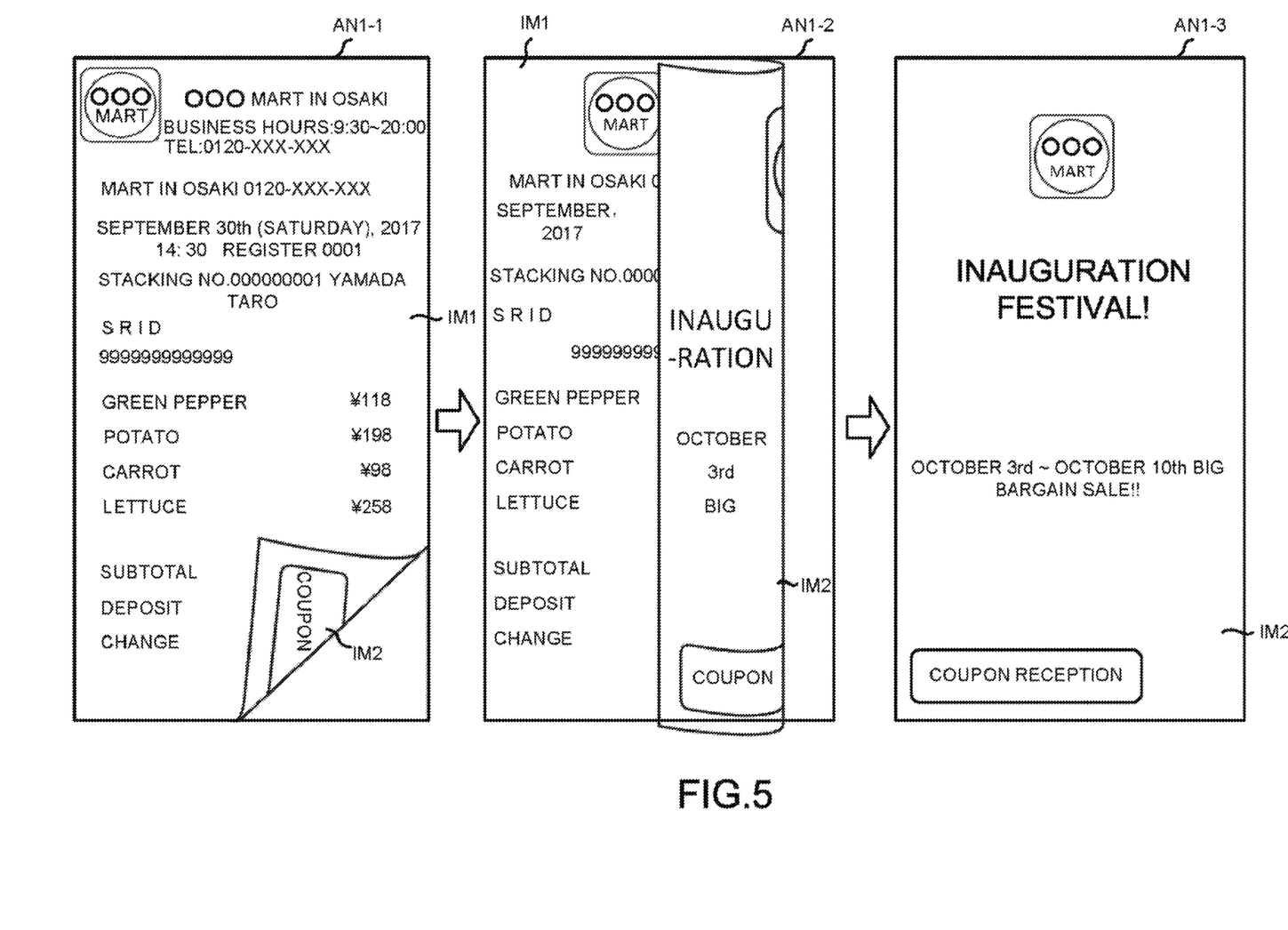
FIG. 5 is a diagram illustrating an example of transition of a change animation.

FIG. 5 is a diagram illustrating an example of transition of the change animation.

As shown in FIG. 5, the processor 11 generates the change animation imitating a situation in which the paper receipt on which a receipt image IM1 is formed on a front surface and an advertisement image IM2 is formed on a back surface is turned over, and controls the touch panel 14 to display the change animation in place of the receipt image IM1. The actual change animation is realized by sequentially switching and displaying frames of moving images functioning as a continuity of many images in a short time such as 1/30 second, but in FIG. 5, only three frames AN1-1, AN1-2 and AN1-3 are shown. The frame AN1-1, the frame AN1-2, and the frame AN1-3 are displayed in order. Then, the frame AN1-3 becomes the last frame of the change animation. A display period of the frame AN1-3 may be longer than other frames.

FIG. 5 shows an example in which the backward moving operation is performed. The processor 11 may adjust a time interval for changing the frames in the change animation in response to a speed of the swiping operation. If the forward moving operation is performed, the change animation imitates a state of turning over the same paper receipt in a direction opposite to that shown in FIG. 5.

The processor 11 sets an image indicated by the advertisement image data contained in the image data group stored in the auxiliary storage device 13 as the advertisement image IM2. If a plurality of advertisement image data is contained in the image data group, the processor 11 selects one of the plurality of advertisement image data according to a predetermined rule. Any rule may be used for selecting the plurality of advertisement image data, e.g., a predetermined order.

In a state in which the change animation is displayed, the processor 11 proceeds to the processing in Act 12 in FIG. 3.

In Act 12, the processor 11 determines whether or not the display of the change animation is completed. If the change animation is being displayed, the processor 11 determines No, and proceeds to the processing in Act 13.

In Act 13, the processor 11 determines whether or not an advertisement display operation is performed. Then, if the corresponding operation is not performed, the processor 11 determines No and returns to the processing in Act 12.

In this way, the processor 11 stands by until the display of the change animation is completed in Act 12 or the advertisement display operation is performed in Act 13.

If the user is interested in the content of the advertisement image IM2 shown in the change animation, the user performs a predetermined advertisement display operation. The advertisement display operation is an operation for instructing to change the display on the touch panel 14 to the advertisement image IM2. In an embodiment, the advertisement display operation is an operation of swiping the display surface of the touch panel 14 upward or downward. If such an advertisement display operation is performed, the processor 11 determines Yes in Act 13, and proceeds to the processing in Act 14.

In Act 14, the processor 11 controls the touch panel 14 to display the advertisement browsing screen. The advertisement browsing screen displays the entire advertisement image IM2 as a still image. At this time, the processor 11 may immediately terminate the display of the change animation and shift to the display of the entire advertisement image, or may display the frame AN1-3 in the fixed manner after displaying the change animation until the last frame AN1-3.

In Act 15, the processor 11 stands by until a termination operation is performed. The termination operation is a predetermined operation for instructing the display termination of the advertisement browsing screen. For example, it is assumed that the termination operation is an operation of swiping the display surface of the touch panel 14 in the left direction or the right direction. Then, if the termination operation is performed, the processor 11 determines Yes and proceeds to the processing in Act 16.

If the display of the last frame AN1-3 of the change animation is terminated after a predetermined period elapses in the standby state of Act 12 and Act 13, the processor 11 determines Yes in Act 12 as the display of the change animation is completed. In this case, the processor 11 passes the processing in Act 14 and Act 15 and proceeds to the processing in Act 16. In other words, the processor 11 controls the touch panel 14 to display the advertisement image IM2 only within the change animation, and proceeds to the processing in Act 16 without displaying the advertisement browsing screen.

In Act 16, the processor 11 determines whether or not the direction flag is in the set state. If the direction flag is in the set state, the processor 11 determines Yes, and proceeds to the processing in Act 17. If it is in the reset state, the processor 11 determines No, and proceeds to the processing in Act 18.

In Act 17, the processor 11 controls the touch panel 14 to display the receipt browsing screen SC1 previous to the receipt browsing screen SC1 displayed before starting the display of the change animation. The previous receipt browsing screen SC1 refers to a screen showing the receipt image IM1 indicated by the receipt image data corresponding to the transaction executed prior to the receipt image IM1 displayed before starting the display of the change animation. After this, the processor 11 proceeds to the processing in Act 19.

In Act 18, the processor 11 controls the touch panel 14 to display the receipt browsing screen SC1 next to the receipt browsing screen SC1 displayed before starting the display of the change animation. The next receipt browsing screen SC1 refers to a screen showing the receipt image IM1 indicated by the receipt image data corresponding to the transaction executed next to the receipt image IM1 displayed before starting the display of the change animation. After this, the processor 11 proceeds to the processing in Act 19.

In Act 19, the processor 11 determines whether or not the number of remaining images in the auxiliary storage device 13 is small. For example, when the number of remaining images is equal to or smaller than a predetermined threshold value, the processor 11 determines that the number of remaining images is small. When the direction flag is in the set state, the number of remaining images refers to the number of images remaining in the auxiliary storage device 13 and corresponding to the transactions executed prior to the transaction corresponding to the receipt image IM1 shown on the receipt browsing screen SC1 in Act 17. When the direction flag is in the reset state, the number of remaining images refers to the number of images remaining in the auxiliary storage device 13 and corresponding to the transactions executed after the transaction corresponding to the receipt image IM1 shown on the receipt browsing screen SC1 in Act 18. Then, if the number of remaining images is small, the processor 11 determines Yes, and proceeds to the processing in Act 20.

In Act 20, the processor 11 requests the receipt server 20 for additional transfer of the image data. Specifically, the processor 11 controls the communication interface 15 to transmit the request data containing the command predetermined for the request and the direction flag to the receipt server 20 through the communication network 40.

If the request data is transmitted to the receipt server 20 through the communication network 40, the request data is received by the communication interface 24. In response to this, the processor 21 controls the communication interface 24 to transmit the image data group in the same way as in a case in which the request in Act 1 is received. However, in this case, the processor 21 includes the receipt image data that is not transmitted to the user terminal 10 yet in the image data group. If the direction flag is in the set state, the processor 21 includes, in the image data group, the receipt image data relating to the transaction performed prior to the transaction corresponding to the receipt image data already transmitted to the user terminal 10 up to now. If the direction flag is in the reset state, the processor 21 includes, in the image data group, the receipt image data relating to the transaction performed after the transaction corresponding to the receipt image data which is already transmitted to the user terminal 10 so far.

If the image data group is transmitted to the user terminal 10 through the communication network 40, the image data group is received by the communication interface 15.

In Act 21, the processor 11 stores the image data group received by the communication interface 15 in the auxiliary storage device 13 as described above.

After that, the processor 11 returns to the standby state in Act 4 to Act 6 in FIG. 2 and repeats the above-described operation. If the number of remaining images is not small, the processor 11 determines No in Act 19, passes the processing in Act 20 and Act 21, and returns to the standby state in Act 4 to Act 6. In a case in which the processor 21 includes the receipt image of the latest transaction in the image data group as described above in response to the request in Act 1, if the direction flag is in the reset state, there is not the receipt image data required to be transmitted to the receipt server 20. Therefore, in this case, in Act 19, the processor 11 may determine No if the direction flag is in the reset state.

Among the above processes, the receipt browsing screen SC1 is an example of a content screen. The screen when the change animation is being displayed shows the advertisement image IM2 and corresponds to the first advertisement screen. The advertisement browsing screen corresponds to the second advertisement screen. The touch panel 14 is an example of a display device. The backward moving operation or the forward moving operation is an example of a change instruction. The advertisement display operation is an example of an advertisement display instruction. The termination operation is an example of a cancellation instruction. The period since the backward moving operation or the forward moving operation is performed until the display of the change animation is completed corresponds to a change period. In this change period, an operation for instructing the display of the advertisement is received, and the change period corresponds to a reception period. Then, the processor 11 determines the change animation as a display target at least until the advertisement display operation is performed during the period since the change instruction is issued in response to the backward moving operation or the forward moving operation until the display of the change animation is completed. If the advertisement display operation is performed during the period in which the change animation is displayed, the processor 11 determines the advertisement browsing screen as the display target within the period from the end of the change period until the termination operation is performed. Furthermore, when the display of the change animation is completed, if the advertisement display operation is not performed during the display period of the change animation, the processor 11 determines the receipt browsing screen SC1 is determined as the display target within the period until the next backward moving operation or forward moving operation is performed since the display of the change animation is completed. Thus, the processor 11 executes the information processing by executing the receipt client application P11, and in this way, the computer having the processor 11 as the central part functions as a determination module for making the above determination.

The processor 11 controls the touch panel 14 to display the screen determined as the display target as described above. Thus, the processor 11 executes the information processing by executing the receipt client application P11, and in this way, the computer having the processor 11 as the central part functions as a display control module.

As described above, according to the user terminal 10, if the change to the receipt browsing screen SC1 to be displayed is instructed, the advertisement image IM2 is temporarily displayed in the change animation, and if the operation for instructing the display of the advertisement image is not performed, a new receipt browsing screen SC1 is displayed. Therefore, if the user is not interested in the advertisement image IM2 temporarily displayed as described above, the user does not perform any operation, and a new receipt browsing screen SC1 is automatically displayed, and the convenience of the user does not decrease. Then, through the above temporary display, the user who browses the receipt browsing screen SC1 can brow the advertisement image IM2, and if the user performs the operation for instructing the display of the advertisement image, the advertisement image IM2 is displayed thereafter until the termination thereof is instructed. Therefore, the user can firmly confirm the content of the advertisement screen IM2 he/she is interested in.

According to the user terminal 10, since the change animation is displayed which imitates a situation in which the paper receipt on which the receipt image IM1 is formed on the front surface and an advertisement image IM2 is formed on the back surface is turned over, the user can casually browse the advertisement image IM2 in the display while turning over the receipt displayed previously to change the receipt browsing screen SC1. As a result, it is possible to reduce uncomfortable feeling of the user when he/she is not interested in the advertisement image IM2.

According to the user terminal 10, since the operation for instructing the change of the receipt browsing screen SC1 is the swiping operation in left or right direction, and the operation for instructing the display of the advertisement browsing screen is the swiping operation in upward or downward direction, the user who is interested in the advertisement image IM2 displayed by the swiping operation in the left or right direction while the user performs the swiping operation in the left or right direction to change the receipt browsing screen SC1 can easily instruct the display of the advertisement browsing image by a series of operations such as moving a finger moving in the left or right direction in the upward or downward direction.

According to the user terminal 10, since the operation for instructing the termination of the display of the advertisement browsing screen is the swiping operation in the left or right direction, the operations for changing the display to the new receipt browsing screen SC1 are the same both in a case in which the receipt browsing screen SC1 is displayed and in a case in which the advertisement browsing screen is displayed, thereby facilitating the operation of the user.

The aforementioned embodiments can be modified as follows.

In a case of displaying a screen showing any other type of content instead of the receipt browsing screen SC1, the same operations as in the above embodiment can be performed.

The advertisement screen displayed between the receipt browsing screens SC1 may be any type of content other than an animation. For example, the advertisement image IM2 may be displayed as a still image.

The user terminal 10 may notify the receipt server 20 of the content of the operation by the user, and the change of the display screen on the touch panel 14 of the user terminal 10 may be controlled through the information processing by the processor 21. In this case, the receipt server 20 has a function of the content display control device.

The processing for changing the display screen on the touch panel 14 may be shared by the processor 11 and the processor 21.

The various operations discussed above can be replaced by any other operation accepted by the user terminal.

The advertisement display operation may be received only in a part of the period in which the change animation is displayed. The advertisement display operation performed prior to the backward moving operation or the forward moving operation may be received.

One receipt image data which is a new display target may be transmitted from the receipt server 20 to the user terminal 10 every time the instruction for changing the receipt browsing screen SC1 is issued.

The above-described information processing performed by the processor 11 and the processor 21 can be changed appropriately, for example, by omitting a part of processing, changing an order of a part of the processing, or the like.

A part or all of the functions realized by the processor and the processor 21 by executing the information processing may be realized by hardware which executes the information processing not based on a program, such as a logic circuit or the like. Each of the above-described functions may also be realized by combining software control with the hardware such as the above logic circuit or the like.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An electronic receipt system comprising a receipt server and a portable user terminal that communicates with the receipt server to acquire images for display on the portable user terminal, wherein the receipt server includes:
   a first network interface,
   a memory that stores:
      a user code in association with a plurality of receipt images, and
      a plurality of advertisement images, and
   a first processor configured to, upon receipt of a request with a user code through the first network interface, search the memory for two or more of the receipt images associated with the received user code and one or more of the advertisement images related to the received user code, and control the first network interface to transmit the receipt images and advertisement images; and the portable user terminal includes:
   a second network interface,
   a touch display, and
   a second processor configured to:

control the second network interface to transmit to the receipt server a request with a user code, upon receipt of two or more receipt images and one or more advertisement images from the receipt server, control the touch display to display a first screen that displays all of a first receipt image included in the received receipt images, control the touch display to display a second screen in place of the first screen in response to a first input on the touch display while the first screen is displayed, the second screen displaying most of the first receipt image and a part of a first advertisement image included in the received advertisement images, control the touch display to display a third screen in place of the second screen in response to a second input on the touch display while the second screen is displayed, the third screen displaying all of the first advertisement image, and control the touch display to display a fourth screen in place of the second screen if the second input is not made on the touch display within a predetermined period of time while the second screen is displayed, the fourth screen displaying all of a second receipt image included in the received receipt images, wherein the second processor is further configured to:

count a number of the received receipt images displayed on the touch display, and when the number of the received receipt images that have not been displayed on the touch display is less than or equal to a threshold, control the second network interface to transmit to the receipt server another request with the user code, and upon receipt of two or more receipt images and one or more advertisement images from the receipt server, control the touch display to display a list of the received receipt images, and upon selection of one of the receipt images, control the touch display to display a screen that displays all of the selected receipt image.

2. The electronic receipt system according to claim 1, wherein the second screen displays the first receipt image and the first advertisement image using an animation.

3. The electronic receipt system according to claim 2, wherein the animation shows a sheet being turned over while showing the first receipt image on a front surface of the sheet and the first advertisement image on a back surface of the sheet.

4. The electronic receipt system according to claim 1, wherein each of the first and the second input is a swipe action on the touch display.

5. The electronic receipt system according to claim 4, wherein the first input is the swipe action in a first direction on the touch display.

6. The electronic receipt system according to claim 5, wherein the second input is the swipe action in a second direction crossing the first direction on the touch display.

7. The electronic receipt system according to claim 1, wherein the second processor is further configured to, in response to a third input on the touch display while the third screen is displayed, control the touch display to display the fourth screen in place of the third screen.

8. The electronic receipt system according to claim 7, wherein the third input is a swipe action in a first direction on the touch display.

9. The electronic receipt system according to claim 1, wherein the first receipt image is an image of a receipt that was most recently stored in the receipt server.

10. A method carried out by an electronic receipt system including a receipt server and a portable user terminal that communicates with the receipt server to acquire images for display on the portable user terminal, the method comprising:

storing, in a memory of the receipt server, a user code in association with a plurality of receipt images, and a plurality of advertisement images;

transmitting, from the portable user terminal to the receipt server, a request with a user code;

upon receipt of the request with the user code by the receipt server, searching the memory for two or more of the receipt images associated with the received user code and one or more of the advertisement images related to the received user code, and transmitting to the portable user terminal the receipt images and advertisement images;

upon receipt of the receipt images and the advertisement images by the portable user terminal, displaying on a touch display of the portable user terminal a first screen that displays all of a first receipt image included in the received receipt images;

displaying on the touch display a second screen in place of the first screen in response to a first input on the touch display while the first screen is displayed, the second screen displaying most of the first receipt image and a part of a first advertisement image included in the received advertisement images;

displaying on the touch display a third screen in place of the second screen in response to a second input on the touch display while the second screen is displayed, the third screen displaying all of the first advertisement image;

displaying on the touch display a fourth screen in place of the second screen if the second input is not made on the touch display within a predetermined period of time while the second screen is displayed, the fourth screen displaying all of a second receipt image included in the received receipt images;

counting a number of the received receipt images displayed on the touch display; and when the number of the received receipt images that have not been displayed on the touch display is less than or equal to a threshold, transmitting, from the portable user terminal to the receipt server, another request with the user code; and upon receipt of two or more receipt images and one or more advertisement images from the receipt server, displaying on the touch display a list of the received receipt images, and upon selection of one of the receipt images, displaying on the touch display a screen that displays all of the selected receipt image.

11. The method according to claim 10, wherein the second screen displays the first receipt image and the first advertisement image using an animation.

12. The method according to claim 11, wherein the animation shows a sheet being turned over while showing the first receipt image on a front surface of the sheet and the first advertisement image on a back surface of the sheet.

13. The method according to claim 10, wherein each of the first and the second input is a swipe action on the touch display.

14. The method according to claim 13, wherein the first input is the swipe action in a first direction on the touch display.

15. The method according to claim 14, wherein the second input is the swipe action in a second direction crossing the first direction on the touch display.

16. The method according to claim 10, further comprising:
   in response to a third input on the touch display while the third screen is displayed,
      displaying the fourth screen in place of the third screen.

17. The method according to claim 16, wherein the third input is a swipe action in a first direction on the touch display.

18. The method according to claim 10, wherein the first receipt image is an image of a receipt that was most recently stored in the receipt server.

* * * * *